(12) United States Patent
Lu et al.

(10) Patent No.: US 6,581,145 B1
(45) Date of Patent: **\*Jun. 17, 2003**

(54) MULTIPLE SOURCE GENERIC MEMORY ACCESS INTERFACE PROVIDING SIGNIFICANT DESIGN FLEXIBILITY AMONG DEVICES REQUIRING ACCESS TO MEMORY

(75) Inventors: Manuel Lu, Union City, CA (US); Ramesh Mogili, Santa Clara, CA (US)

(73) Assignee: Oak Technology, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,860

(22) Filed: Mar. 3, 1999

(51) Int. Cl.[7] .............................................. G06F 12/06
(52) U.S. Cl. ......................... 711/167; 711/151; 710/18
(58) Field of Search .......................... 710/129, 17, 18, 710/20, 21, 22; 711/149, 4, 129, 202, 112, 1, 167, 151; 712/29; 709/222, 200; 345/520, 501; 713/400

(56) References Cited

U.S. PATENT DOCUMENTS 5,566,306 A * 10/1996 Ishida ........................ 710/309
5,933,623 A * 8/1999 Umemura et al. ........... 713/400
5,956,741 A * 9/1999 Jones ............................ 711/1
5,987,501 A * 11/1999 Hamilton et al. ........... 709/203
6,167,491 A * 12/2000 McAlpine .................... 711/149

FOREIGN PATENT DOCUMENTS

EP               082765 A1  * 12/1982

* cited by examiner

Primary Examiner—Matthew Kim
Assistant Examiner—Pierre-Michel Bataille
(74) Attorney, Agent, or Firm—John F. Schipper

(57) ABSTRACT

An electronic system is described herein, the apparatus including at least two devices requiring access to memory, a memory controller, and a memory, the memory being coupled to an output of the memory controller. The memory controller includes at least one input and at least one output; one memory controller input being operatively coupled to at least one of the devices through a shared bus, and one memory controller output being operatively coupled to at least one device through a shared bus. The shared bus includes a plurality of device select lines, a plurality of address lines, a plurality of write data lines, a plurality of read data lines, a plurality of read select lines, and at least two device_request lines.

6 Claims, 4 Drawing Sheets

MULTIPLE SOURCE GENERIC MEMORY ACCESS INTERFACE PROVIDING SIGNIFICANT DESIGN FLEXIBILITY AMONG DEVICES REQUIRING ACCESS TO MEMORY

BACKGROUND OF THE INVENTION

1. Field of the Invention

The present invention relates to electronic systems having multiple devices which communicate with each other. More particularly, the present invention relates to an apparatus that acts as an interface between multiple devices and a state machine handling data transfers into and out of memory.

2. The Prior Art

Modern electronic systems employing memory devices for data storage typically employ several types of devices such as central processing units, and video and sound devices, all of which need to have read/write access to memory.

FIG. 1 is a block diagram depicting a prior art electronic system employing several devices requiring read/write access to memory.

Referring to FIG. 1, MPEG signal source 10 provides an input signal to MPEG device 12 which processes that input signal, and provides output data to be stored in memory 14. Central processing unit 16, transport device 18, and other device 20 may also require access to memory 14 for the storage and retrieval of data. Transport device 18 may be defined as a device for receiving audio or video signals over antenna 22.

Each one of devices 12, 16, 18, and 20, will, at times, individually request memory access through memory controller 24 using interconnect paths 26, 28, 30, and 32 respectively. Because each device has different requirements for accessing and transmitting data, memory controller 24 has individual protocol translators 34, 36, 38, and 40 which are device specific, and which act on communications received from a given device, translating the information received into a format understandable by a state machine within memory controller 24 which handles the actual data transfers into and out of memory.

Although not applicable in every prior art case, the system previously described may be designed to reside on a single integrated circuit, the boundaries of which might be such as is defined by border 42.

The prior art apparatus, while being suitable for its intended purpose, has a significant drawback which is solved by the present invention. Because each of the devices MPEG device 12, CPU 16, transport device 18 and other device 20 have different requirements with respect to interfacing with memory, whenever one of these devices is replaced with a different device, or when a new device is added to the system, the memory controller 24 must be redesigned to accommodate the specific interface and data transfer requirements of the new device.

Prior art systems have translators 34, 36, 38, and 40 which are device specific, and which act on communications received from a given device, translating the information received into a format understandable by a state machine associated with memory controller 24. The redesign of the memory controller 24 to include the specific interface requirements of a new device is costly and time consuming.

In the prior art, when an existing device is replaced with a new device, or when a new device is added to the system, devices 12, 16, 18, and 20, as well as memory controller 24 would have to be redesigned. However, a system employing the present invention significantly reduces the amount of time which is required to redesign circuits when existing devices are replaced or new devices are added to a system such as described herein.

According to a first principle of the present invention, a common interface is provided between devices needing access to memory, and a state machine which manages the retrieval of data from memory. According to a second principle of the present invention, a universal interface is provided for devices requiring access to memory, the interface minimizing redesign efforts required when a new device is added or an old device is replaced. According to a third principle of the present invention, a universal memory interface is provided which decouples the requirements of the memory controller from other circuitry, thus allowing for significant design flexibility among devices requiring access to memory for storage and/or retrieval of data.

SUMMARY OF THE INVENTION

An electronic system is described herein, the system including at least two devices requiring access to memory, a memory controller, and a memory coupled to an output of the memory controller. The memory controller includes at least one input and at least one output. The at least one input is operatively coupled to at least two devices through a shared bus, and the at least one output is coupled to a memory. The shared bus includes a plurality of device select lines, a plurality of address lines, a plurality of write data lines, a plurality of read data lines, a plurality of read select lines, and at least two device_request lines.

DETAILED DESCRIPTION OF AN EMBODIMENT

Those of ordinary skill in the art will realize that the following description of the present invention is illustrative only and not in any way limiting. Other embodiments of the invention will readily suggest themselves to such skilled persons.

Reference designations used herein within more than one drawing figure are intended to represent same or similar structures in each figure in which they appear, unless otherwise noted herein.

Figure 1:
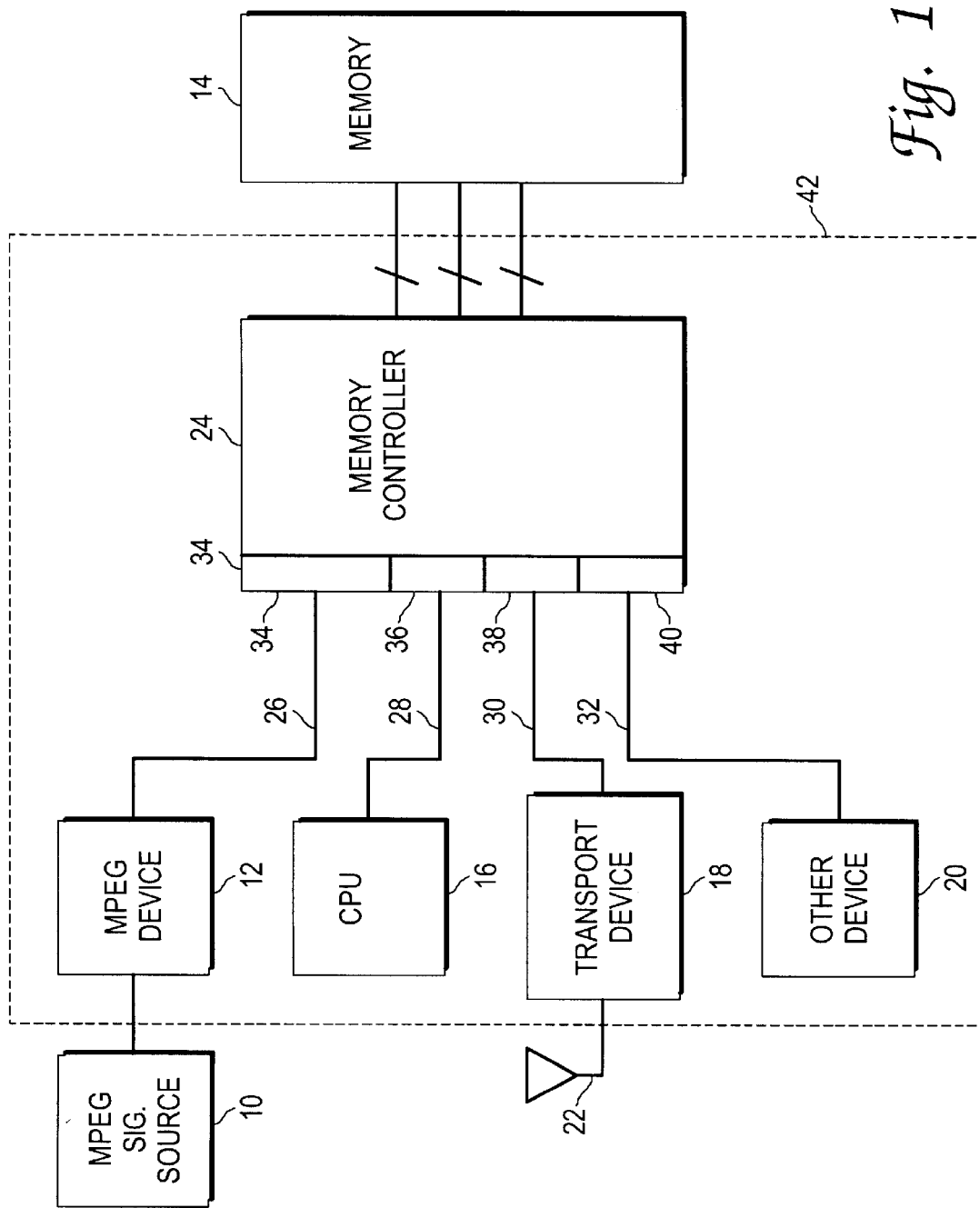
FIG. 1 is a block diagram depicting a prior art electronic system employing several devices requiring read/write access to memory.
Figure 2:
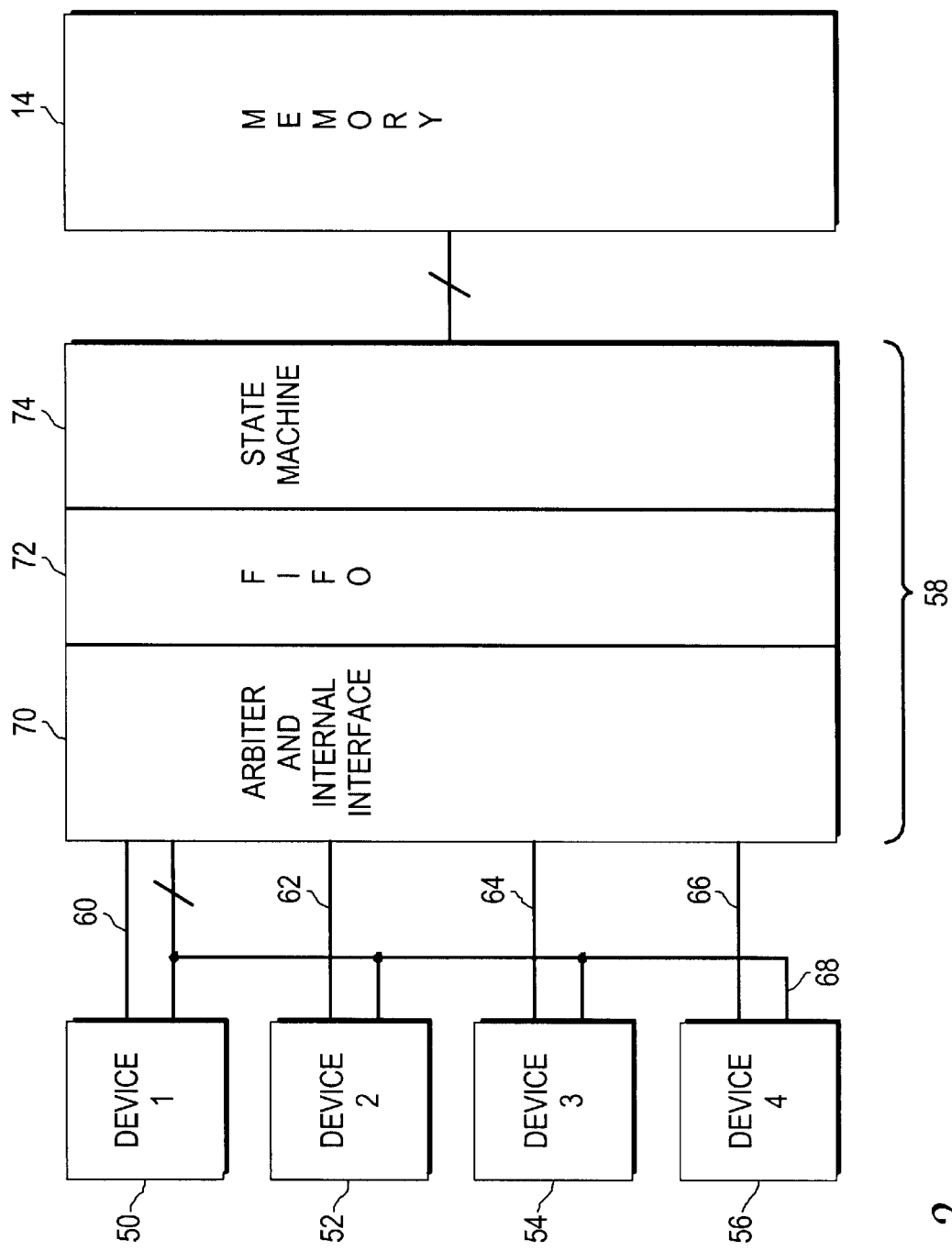
FIG. 2 is a block diagram depicting one embodiment of the present invention.

FIG. 2 is a block diagram depicting one embodiment of the present invention.

Referring to FIG. 2, devices 50, 52, 54, and 56 are coupled to memory controller 58 through individual request lines 60, 62, 64, and 66, and shared bus lines 68. Memory controller 58 comprises an arbiter and internal interface 70 (herein referred to as interface 70), a first-in, first-out (FIFO) memory 72, and a state machine 74.

Interface 70 handles the data transactions to and from each device and FIFO 72, and state machine 74 handles the data transactions to and from memory 14. FIFO 72 is provided for the temporary storage of transaction data coming from any of the devices to memory 14. Requests for the storage or retrieval of data from any of devices 50, 52, 54, or 56, are processed by interface 70 and then queued in FIFO 72 for handling by state machine 74.

It is contemplated that virtually any type of memory may be accommodated using the present invention. Those of ordinary skill in the art would be aware that the specific configuration of state machine 74 depends upon the specific type of memory involved, and the format and content of the data stored in FIFO 72. Those of ordinary skill in the art, after determining the type of memory to be used in an actual system being designed, and having knowledge of the particular data structure to be utilized for the storage of data in FIFO 72, would have the skills necessary to define the required state machine using a high level language, such as Verilog Hardware Description Language (VHDL).

It would also be readily recognized by those of ordinary skill in the art that FIFO 172 is not necessary to the practice of the invention. Rather, instructions received from any of devices 50, 52, 54 or 56 could be immediately passed on t state machine 74 for processing. In an embodiment which doesn't include a FIFO 72, data being transmitted between Interface 70 and state machine 74 may be latched, thus temporarily holding valid data until the receiving stage is ready to receive the data.

Figure 3:
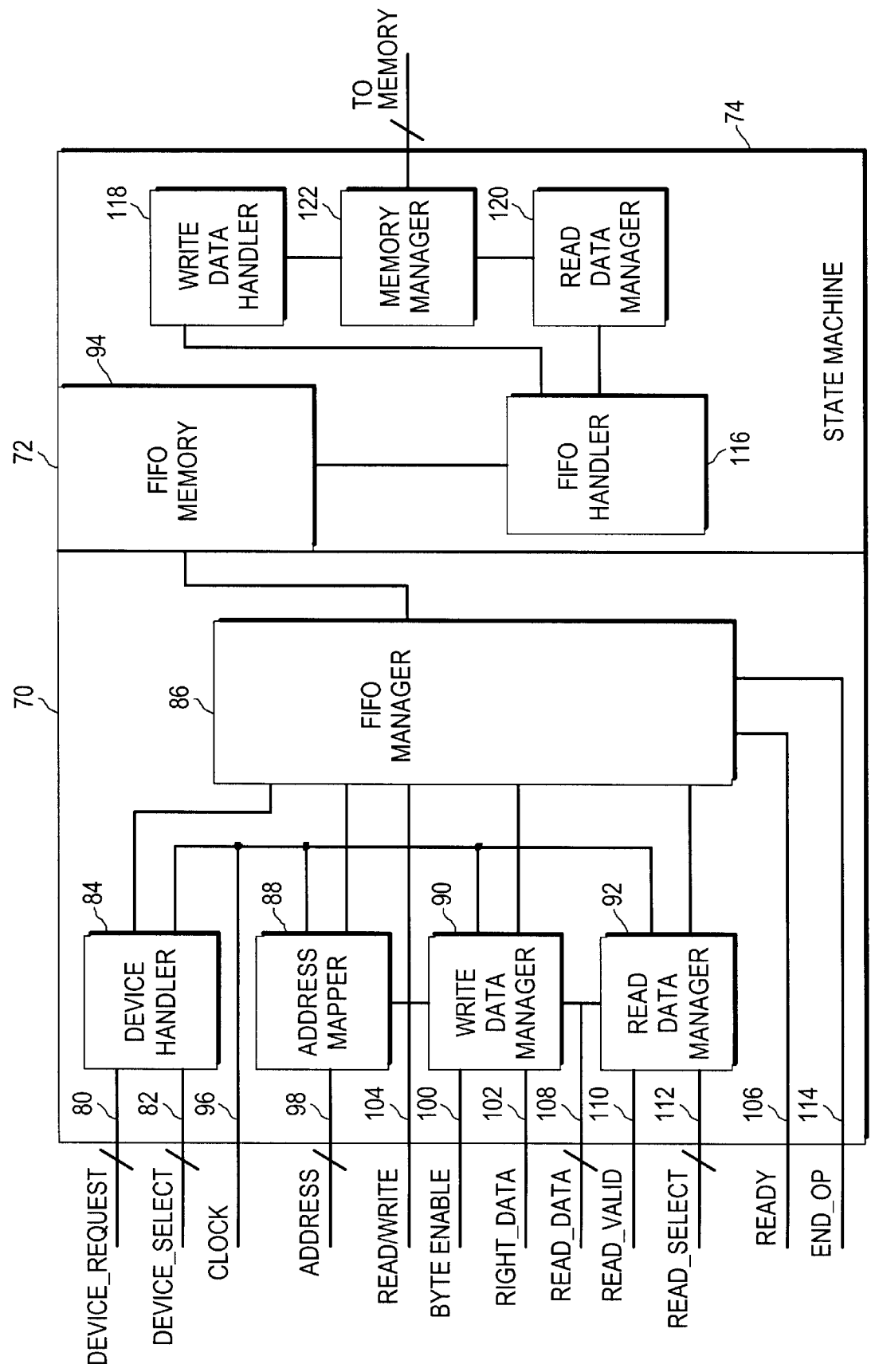
FIG. 3 is a block diagram depicting the FIG. 2 embodiment of the present invention showing more detail of the signal lines of the generic interface.

FIG. 3 is a block diagram depicting the FIG. 2 embodiment of the present invention showing more detail of the signal lines of the generic interface.

Referring to FIG. 3, device_request lines 80 and device select lines 82 couple a device such as device such as device 50 of FIG. 2 to device handler 84 of interface 70. Device_request lines 80 is intended to represent individual request lines such as request lines 60, 62, 64, and 66 previously seen in FIG. 2. Thus, there will be as many device_request lines 80 lines as there are individual devices in the system, and each of device_request lines 80 is unique to a given device and not shared with any other device in the system. When a given device, such as any one of devices 60, 62, 64, or 66 as seen in FIG. 2, requires access to memory, the particular one of device_request lines 80 corresponding to the device requiring access is asserted by that device until device handler 84 recognizes the device using device_select lines 82. Device handler 84 receives instructions to enable a given device from FIFO manager 86.

Device_select lines 82 comprise a group of two or more lines which are selectively asserted by interface 70 in order to signal a device that interface 70 is ready to receive its request. In one embodiment of the present invention, device_select lines 82 comprises 5 select lines, giving $2^5=32$ different combinations. Thus, in this embodiment, up to 32 distinct devices could be accommodated.

It is contemplated that many more then 32 devices, or as few as two devices, may be accommodated by a system incorporating the present invention, so long as there is one device_request line 80 per device, and as long as there are enough device_select lines 82 to give each device a distinct identity.

FIFO manager 86 is coupled to device handler 84, address mapper 88, write data manager 90 and read data manager 92 through bidirectional paths, and is responsible for managing data transfers to and from FIFO 94.

Clock line 96 is coupled to a source of a standard clock signal provided for system timing. It is contemplated, but not required, for the practice of the present invention that this clock signal be provided by a standard clock source external to the operating environment of the present invention. The only requirement is that this same signal, however generated, be provided to devices 50, 52, 54 and 56, memory controller 58, and memory 14 (all of FIG. 2), so that all devices in the system are synchronized.

Address lines 98 couple the address signals transmitted from a device to address mapper 88. Address mapper 88 determines if the addresses received from a given device are real addresses, or are instead virtual addresses. If the addresses are virtual, address mapper 88 translates the addresses into real addresses or row and column addresses for the specific memory type, and then provides those addresses to FIFO manager 86 for storing into FIFO 94 when appropriate.

In one embodiment of the present invention, address lines 98 are 20 bits wide, and each data segment within memory is 8 bytes wide. Thus, in the system just described, $2^{20} \times 8$ bytes=8 megabytes of memory may be addressed. It is contemplated, and well within the capabilities of those of ordinary skill in the art; that smaller or larger memory sizes may be accommodated, depending on system requirements. Smaller or larger memory sizes may require less or more address lines, commensurate with the memory size.

Byte_enable lines 100 are provided so that a particular one of the 8 bytes of a data word being provided to memory may be selected for writing by a given device. The particular byte_enable lines 100 are used to selectively mask a desired byte or bytes. Byte_enable lines 100 are only used during writing, and are ignored during a read operation. Those of ordinary skill in the art will readily recognize that byte_enable lines 100 may be 8 bits wide as seen in this embodiment, or may instead be 4 bits wide, 16 bits wide, or any other width required by the system implementing the present invention. It is also contemplated that byte_enable lines 100 need not be present in a system employing the present invention, depending on the needs of the system designer.

Write_data lines 102 are provided so that data may be transferred from any one of the devices 50, 52, 54 or 56, as seen in FIG. 2, to write manager 90. Write_data lines 102 are only active during a write cycle, and are masked according to the value of byte_enable lines 100. In one embodiment, the width of write data lines 102 is 64 bits, providing access to 8-bytes of memory area at a time. However, it is contemplated that other byte widths of write_data lines 102 may be used, such as 4 bytes (32 bits), or 12 bytes (96 bits), or other widths, without departing from the scope or purpose of the present invention.

Write data manager 90 receives incoming write data and byte enable information and holds it until FIFO manager 86 is ready to receive it. FIFO manager 86 signals write data manager 90 at an appropriate time to transfer write data information.

Read/write line 104 is asserted by the current device when the device is performing a write operation, and deasserted when that device is performing a read operation. In one embodiment, read/write 104 is asserted high, and deasserted low. However, those of ordinary skill in the art would readily recognize that the write and read assert conditions may be reversed.

Ready line 106 is asserted by FIFO manager 86 when interface 70 is ready to accept another address, command, and data set. Thus, in the unlikely event that FIFO 94 is full and thus unable to receive any data, ready line 106 is deasserted by FIFO manager 86, signaling any device currently attempting a data operation to continue to assert the data, command, and address buses until interface 70 is ready to accept and process information.

A memory transfer may consist of either a read or a write operation. Here, read and write operations are allowed to be interspersed, thus,allowing for any combination of read and write operations by a given device, while it retains control of the bus, so long as the total number of transfers in a given session does not exceed a number determined by the system designers.

Shared read_data lines 108 couple devices 50, 52, 54 and 56 (seen in FIG. 2) to read data manager 92 Read_data lines 108 are only active during a read cycle, and data transferred over read_data lines 108 is only considered valid and usable when read_valid line 110 is asserted. In one embodiment of the present invention, read_data lines 108 are 64 bits wide, providing access to 8-bytes of memory area in one clock cycle. However, it is contemplated that read_data lines 108 may have other widths, such as 4 bytes (32 bits), or 12 bytes (96 bits), etc., without departing from the principles of the present invention.

Read_data lines 108 are shown in the particular configuration herein so that read and write data can be decoupled. By decoupling read and write data, latency experienced during read cycles will not affect write data, resulting in a higher total data throughput, since write data will not be held while the system waits during read latency periods.

Read_select lines 112 are a group of two or more lines which are selectively asserted by read_data manager 92 of interface 70 in order to signal a device that read_data manager 92 is ready to transfer data to that device. In the embodiment of the present invention described herein, read_select lines 112 include 5 select lines, giving $2^5=32$ different combinations. Thus, in this embodiment of the present invention, up to 32 distinct devices may be present in the system.

End_op line 114 is provided so that a device which has been granted the use of shared bus lines 68 may indicate when the last operation is being performed, in a given transfer session. Thus, a device will assert end_op line 114 during the final data transfer for a session.

Once FIFO manager 86 is notified by the various handlers and mappers that needed data is available for transfer to FIFO 94, FIFO manager 86 transfers that data to FIFO 94 using methods known to those of ordinary skill in the art. Those of ordinary skill in the art would be aware that the particular methods used would depend on the particular FIFO 94 being used. In a write operation from a device such as any one of devices 50, 52, 54 or 56 (seen in FIG. 2), FIFO manager 86 would transfer the address and data into FIFO 94. If a read operation is being requested, only the address or address range corresponding to the needed data would be by FIFO manager 86 into FIFO 94. In read and write operations, the type of operation must also be stored so that it is known which direction the request or data is flowing.

Once data is stored in FIFO 94, it is retrieved by FIFO handler 116 of state machine 74 and then passed to either of write data handler 118 or read data handler 120, depending on the task to be performed. Memory manager 122 controls the actual data transfers into and out of memory 14 (from FIG. 2). Those of ordinary skill in the art would be readily aware how to design and implement many types of state machines 74. Each state machine 74 will differ according to the specific requirements of the memory 14 to which it interfaces, since the primary purpose of the state machine is to provide an apparatus for transferring data from the FIFO 94 to and from memory 14.

Figure 4:
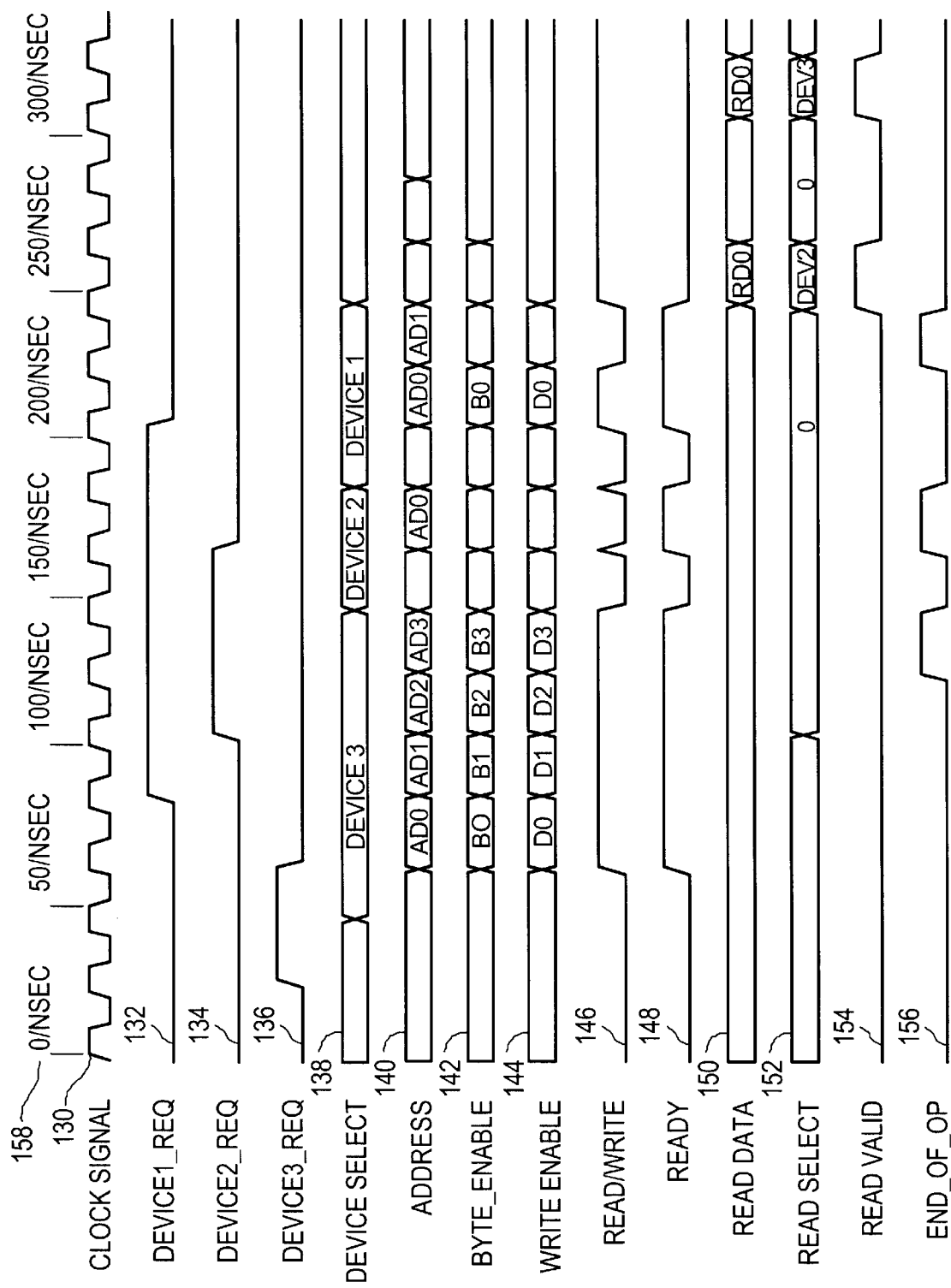
FIG. 4 is a signal transition chart showing the timing of various signals used in the practice of the FIG. 3 embodiment of the present invention.

FIG. 4 is a signal transition chart showing the timing of various signals used in the practice of the FIG. 3 embodiment of the present invention. Persons of ordinary skill in the art will recognize that the signal level may be high or low. Thus, a signal may be asserted high or low, without departing from the scope or purpose of the present invention.

Referring to FIGS. 3 and 4 together, clock signal 130 is supplied from an external source or internal phase locked loop (PLL) supplied to clock line 96 (FIG. 3). Any reasonable clock period may be used at the discretion of the system designer, without departing from the principles of the present invention.

Device1_req signal 132, device2_req signal 134, and device3_req signbal 136 are provided to device handler 84 of interface 70, representing, for example, device 50, device 52, and device 54 (from FIG. 2) respectively. Thus, as previously described, when device 50 requires access to the address bus, device 50 asserts device1_req signal 132 on a unique device_request line 80, indicating the desire for access to interface 70.

Device_select signals 138 are provided collectively to all devices on commonly shared device_select lines 82. Each device 50, 52, 54, and 56 (from FIG. 2) has a unique combination of device_select signals associated with it, so that when the correct combination of device_select lines 82 are asserted, that device 50, 52, 54, or 56 understands that it alone has access to the address bus. For the purposes of the discussion of FIG. 4, a device which has been granted access to the address bus shall be referred to as the "selected" device.

Address signals 140, byte_enable signals 142, write_data signals 144 and read/write signal 146 are provided on address lines 98, byte_enable lines 100, write data lines 102, and read/write line 104 respectively by the selected device. Although not required, byte_enable signals 122 and byte_enable lines 88 may be utilized to mask data written to memory. In one embodiment of the present invention, eight bytes of memory data are written in a given write cycle, and no masking takes place. Should it be desired to write less than all eight bytes of data, the data which is not written remains unchanged.

Ready signal 148 is asserted by FIFO manager 86 when interface 70 is ready to accept address, data, and/or read/write information from a selected device.

Read_data signals 150, read_select signals 152, and read_valid signal 154 are provided by read data manager 92 within interface 70 over shared read_data lines 108, read_select lines 112, and read_valid line 110 respectively. Read_data signals 150, and read_select signals 152 are asserted by interface 70 in the read mode. Read data lines 150 are used to transfer, in parallel, data which has been retrieved from memory 14 for a given one of device 50, 52, 54!, or 56. Read select signals 152 indicate the device which should receive the read_data.

End_of_op signal 156 is provided to FIFO manager 86 within interface 70 by the selected device to indicate that the next transfer of data will complete its request. Alternatively, in addition to or in lieu of end_of_op signal 156 and end_op line 114, count lines may be provided which allow the device_requesting a memory transfer to signal interface 70 how many data transfers are required. Interface 70 would then allow the specified number of transfers, freeing the shared bus for transactions involving other devices at the completion of the last transaction.

Referring now to the time orientation of signals depicted in FIG. 4, a clock signal 130 is supplied to the system so all operations will be synchronized in time. For convenience, time line 158 at the top of FIG. 4 will be used in the discussion which follows. However it is readily understood by those of ordinary skill in the art that the order of operations is more important than meeting the actual timing criteria set forth in this example, since the clock signal 130 for each system might be different than set forth for the embodiment described herein.

The process of reading or writing data begins when a device requests access to the memory by asserting its request line. In this example, device 54 asserts a device3_req signal 136 some time within the second full clock cycle.

Some time after the device3_req signal 136 is asserted by device 54, interface 70 grants device 54 permission to transmit address, command, and data information by asserting the proper ones of device select lines 82 with the unique device select signals 138 which uniquely correspond to device 54. On the rising edge of the next clock signal, device 54 asserts the read/write line 104, and at the same time asserts address signals 140, write_data signals 144, and optional byte_enable signals 142, thus initiating an information transfer. Further, FIFO manager 86 asserts ready line 106 to indicate to device 54 that FIFO manager 86 is ready to receive the information. The data is stored in FIFO 94 in the order of arrival, for later action using that data by state machine 74.

At approximately the middle of the fifth clock cycle, device 50 asserts its device1_req signal 132, thus indicating to FIFO manager 86 that device 50 desires access to memory. However, device 54 already has access, and the system is busy, forcing device 50 to wait, since two devices cannot access the same address lines at the same time.

For each rising edge of clock signal 130, device 54 progressively asserts new address, data, and byte_enable data (as required) on address lines 98, write data lines 102, and byte enable lines 100 respectively, until the final set of data has been asserted.

Following the second data transfer by device 54, device 52 has asserted device2_req signal 134, thus indicating that device 52 desires access to memory.

As the fourth and final set of information from device 54 is asserted, device 54 asserts end_of_op signal 156 on end_op line 114, thus indicating to FIFO manager 86 that the final information transfer in this session for device 54 is in progress.

At approximately the end of the seventh clock cycle, following the transfer of information from device 50 to interface 70, device handler 84 selects device 52 by asserting the combination of device_select signals 138 corresponding to device 52 on device_select lines 82.

Device 50 has asserted its device1_req signal 132 prior to device 52 asserting the device2_req signal 134. In this example, as evidenced by device 52 gaining access to interface 70 prior to device 50, device handler 84 has determined that device 50 has a lower priority for memory access than device 52. The details of arbitration are well-known to those of ordinary skill in the art, and thus will not be discussed herein.

Approximately one clock cycle following device 52 being selected by device handler 84, device 52, in this example, asserts address signals 140 on commonly shared address lines 98, and also asserts end_of_op, signal 156 on commonly shared end_op line 114, since the first operation is also the last one for this device at this time. Finally, by not asserting read/write signal 146, device 52 indicates that a read operation is desired. It is contemplated that read/write line 92 may be configured to indicate a read operation either by being asserted, or by not being asserted. In the embodiment described herein, a read operation is considered requested when the read/write line 104 is not asserted.

At approximately the end of the tenth clock cycle, device 50 asserts the read/write line 104 and at the same time asserts address signals 140, write_data signals 144, and byte_enable signals 142, thus initiating the first of two information transfers, the first transfer being a write to memory, and the second transfer being a read from memory. Further, FIFO manager 86 asserts ready signal 148 to tell device 50 that interface 70 is ready to receive the information.

One full clock cycle later, interface 70 has received address signals 140, write_data signals 144, byte_enable signals 142 and stored the relevant information in FIFO 94. At this time, the second operation, the read operation, is initiated when device 50 asserts address signals 140 and deasserts read/write signal 146. During this second operation, end_op signal 156 is asserted, thus indicating to interface 70 that the shared bus lines may be used by a different device at the completion of the current operation.

At approximately the end of the eleventh clock cycle, following the completion of the read request for device 50, the read data requested by device 52 is ready to transfer from interface 70 to device 52. At this time, read_data signals 150 are provided on read_data lines 108, and read_valid signal 154 is asserted on read_valid line 110, indicating to device 52 that the data asserted on read_data lines 108 is valid.

The final operation described in FIG. 4 is approximately the end of the twelfth clock cycle at which time the read data requested by device 50 is available. This occurs when read_data manager 92 asserts read_valid signal 154 on read valid line 110, thus indicating to device 50 that the data on read_data lines 108 is valid.

Those of ordinary skill in the art would readily recognize that there are many ways for one device to receive data from another device. One way is for the receiving device to latch the incoming data until it can be utilized. The present invention is contemplated for use in systems that receive data in all known ways.

Those of ordinary skill in the art would also readily recognize that a latency exists with many types of memory for read operations, but not for write operations. Thus, a write operation can take place in one clock cycle, but a read operation may take three or more clock cycles, as depicted in FIG. 4 wherein a requested read operation takes 4 clock cycles to complete. This latency is not due in any way to the operation of the memory controller, but rather results from operations which are required by a memory in order to retrieve stored data.

Those of ordinary skill in the art will readily recognize that the example provided herein is only one of many possibilities of the order of operations, type of operations, and timing of operations, capable of being exhibited using the present invention. Many other orders of operations, types, and timing of operations may be possible, without departing from the scope or purpose of the present invention. For example, the read latency from initiation of a read request to the providing of data is depicted in FIG. 4 as approximately four clock cycles. However, those of ordinary skill in the art are aware that memories having other read latencies exist which could be accommodated by the present invention described herein.

Although it is contemplated that the devices and memory controller described herein may be constructed using discrete components, many embodiments will utilize programmable logic devices, wherein the devices and the memory controller are designed to be implemented as a single integrated circuit.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for regulating the transmission and receipt of data between one or more devices within a first set of devices and an interface device, the method comprising:

causing at least one device within the first set to request use of an address bus;

authorizing one device within the first set to use the address bus;

causing the authorized device to assert an address on the address bus;

causing the authorized device to transmit to a selected receiving device a value indicating a number of distinct data transfers the authorized device desires to perform and indicating whether each distinct data transfer will be a write operation;

selecting a device, which has previously executed a read request that has not yet been fulfilled, to accept data over a data bus.

2. The method of claim 1, further comprising:

where said authorized device is authorized to perform said data transfer as said write operation, causing said authorized device to transmit data over a data bus.

3. The method of claim 1, further comprising:

where said authorized device is authorized to perform said data transfer as said write operation, causing said authorized device to mask data to be transmitted.

4. The method of claim 1, further comprising:

causing said authorized device to indicate whether each distinct data transfer will be a read operation.

5. The method of claim 1, further comprising:

causing said interface device to indicate to a receiving device when read data is valid.

6. The method of claim 1, further comprising:

causing said selected device to assert one or more count lines, thus indicating the number of transfer operations to be requested by said selected device.

* * * * *